Feb. 16, 1960 A. J. CRITCHLOW 2,924,981

ELECTROSTRICTIVE POSITIONING DEVICE

Filed Nov. 25, 1957

INVENTOR.
ARTHUR J. CRITCHLOW

BY

Edward A. Robinson

ATTORNEY 2,924,981

ELECTROSTRICTIVE POSITIONING DEVICE

Arthur J. Critchlow, Los Gatos, Calif., assignor to International Business Machines Corporation, New York, N.Y., a corporation of New York Application November 25, 1957, Serial No. 698,733
7 Claims. (Cl. 74—125)

This invention relates to positioning apparatus and more particularly to such apparatus for shifting a member through a desired incremental displacement to accomplish a registration or alignment such as the presentation of a selected character at a printing point for a printing operation.

In an accounting machine or the like, a device may be required to move or position an element with respect to other elements of the machine. One application for such a positioned device is the output mechanism for a machine which is usually a printing arrangement capable of receiving electrical signals representative of data and operable to print characters corresponding to the data signals.

It is an object of this invention to provide an improved positioning device which may be used to present a selected character at a printing point in response to an electrical signal.

A further object of this invention is to provide such a positioning device capable of receiving electrical signals prior to the printing operation, further capable of storing or "remembering" the signals received until a subsequent time when the printing operation is accomplished.

Briefly stated, according to this invention the positioning device includes a displaceable member such as a rack, a plurality of periodically movable drive members and a piezoelectric or electrostrictive element mounted on each of the drive members and engageable with the rack. When a voltage is impressed across the electrostrictive elements, the element is caused to deform and bend toward the rack functioning as a pawl to engage teeth thereon and mechanically couple the rack with the selected drive member. The drive members are arranged to move in sequence and the rack will be moved successively by those drive members selected by a control voltage which causes the electrostrictive element thereon to engage the teeth of the rack.

Other objects of the invention will be pointed out in the following description and claims and illustrated in the accompanying drawings which disclose, by way of example, the principle of the invention and the best mode which has been contemplated of applying that principle.

Figures 1, 2, 3:
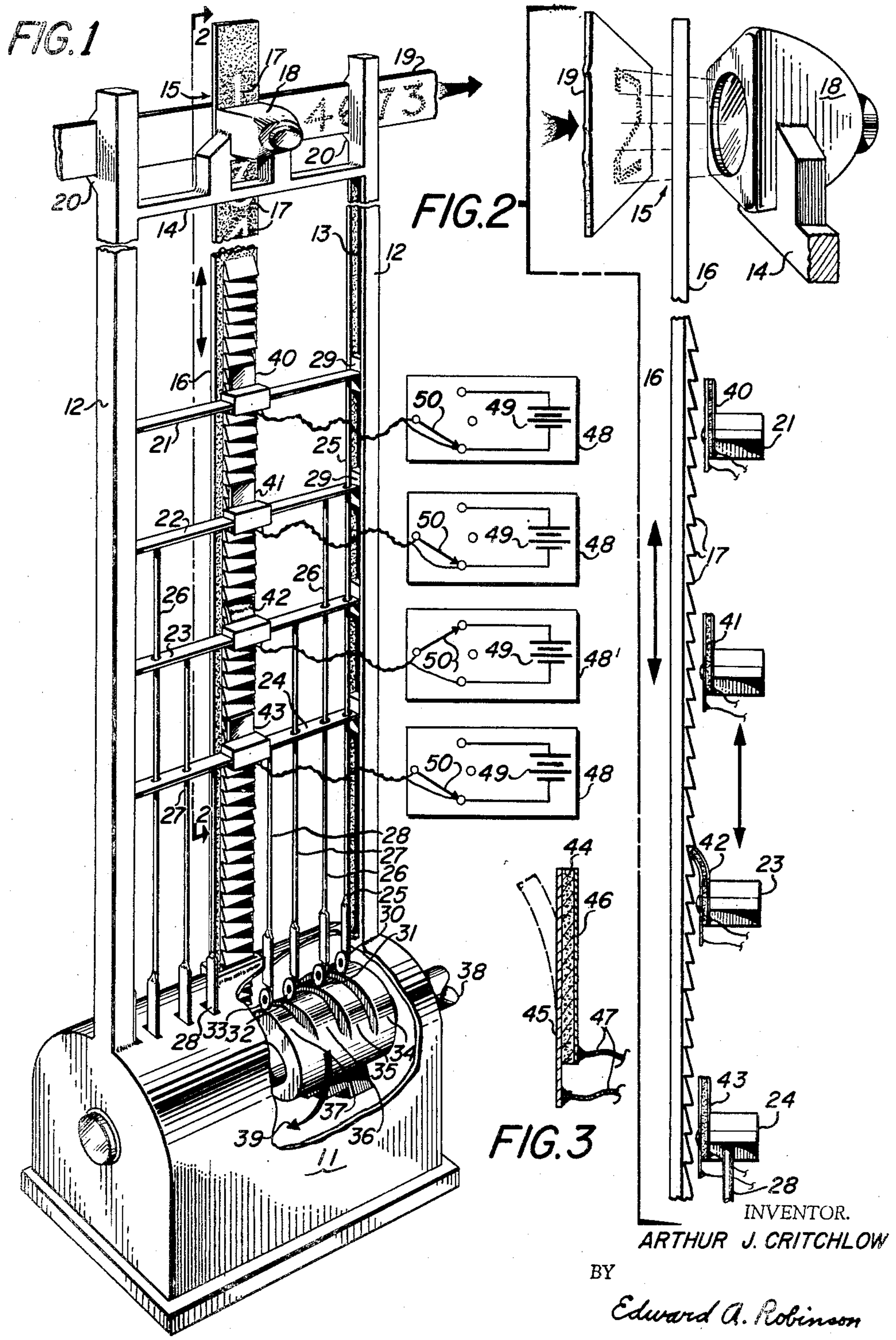
Fig. 1 is a perspective view of the apparatus of this invention together with a simplified schematic circuit diagram of a circuit for charging and discharging the electrostrictive devices.
Fig. 2 is a vertical section along the plane 2—2 of Fig. 1.
Fig. 3 is an enlarged detail of an electrostrictive element used in the apparatus of this invention.

This invention as illustrated in Fig. 1 includes a stationary housing and support member 11 which may have a pair of upstanding, spaced apart legs 12 having a channel groove 13 therein. An upper cross member 14 extending between the legs 12 provides a support for apparatus at a printing point 15. A rack member 16 is formed from lightweight material and mounted to slide vertically. A lower portion of the rack 16 is formed with teeth 17 while an upper portion of the member 16 is provided with characters which may be selectively presented at the printing point 15 by vertical movement of the rack member 16. The characters 17 may be transparencies in an otherwise opaque upper strip of the member 16. A light source 18 may be mounted on the transverse fixed member 14 on one side of the rack member 16 while a light sensitive film 19 may move through supporting slots 20 formed at the upper extremities of the fixed member 12 and pass across the printing point 15 on the opposite side of the rack member 16 from that of the light source 18. In the operation of this printing arrangement, the member 16 slides vertically to selected positions thereby presenting successive selected characters 17 at the printing point 15, and each printing operation is accomplished by flashing the light source 18 through the transparent character 17 and upon the moving light sensitive film strip 19. The film strip 19 may be subsequently developed; or alternatively, the film strip may be sensitive only to ray emanations outside of the visible light spectrum such as ultraviolet radiation, and the source 18 may be an ultraviolet source. No further photographic fixing of such film will be needed since it would not subsequently be exposed to further ultraviolet radiation. The materials and methods for producing images by exposure to ultraviolet radiation and without a subsequent fixing process are disclosed "photometric papers sensitive only to short wave ultraviolet" J. Opt. Soc. Am. 42, 387–392 (1952) and U.S. Patent No. 2,528,496 granted November 7, 1950.

The apparatus of this invention includes a plurality of oscillatory or periodically movable drive members 21, 22, 23 and 24. Each of the drive bars or members 21 through 24 is mechanically coupled to a pair of links or push rods 25 through 28 and is slidably supported in the vertical channels 13 by shoes 29. The push rods 25 through 28 extend downwardly and are terminated with cam followers 30 through 33 which engage and are moved by the cams 34 through 37. The cams 34 through 37 are continuously rotated by drive means associated with a shaft 38 as shown by an arrow 39. As the shaft 38 is rotated the riser portion of the cam 34 first engages and lifts the cam followers 30 causing the push rods 25 to lift the drive bar 21. The push rods 25 may extend through but are not mechanically coupled to the other drive bars 22, 23, and 24.

The drive bar 21 starts from a rest or dwell position and moves upwardly to another rest or dwell position as determined by the cam 34. Upon completion of the stroke or movement of the drive bar 21, the drive bar 22 is thence moved upwardly from a first dwell position to a second dwell position by the cam 35. Likewise, the drive bar 23 is moved upwardly from a first dwell position to a second dwell position; and thence; the final drive bar 24 moves upwardly between a pair of rest positions. It will be appreciated that the drive members or bars 21 through 24 are moved in succession commencing with the uppermost bar 21 which will thus conveniently move ahead and out of the way of the next successive bar 22 which in turn will move out of the way for the operation of the bar 23 and thence the bar 24. After all of the bars have been displaced upwardly, they are returned to their initial rest or dwell position by the cams 34 through 37 which may drop the cam followers 30 through 33 in unison. Movement of the drive members or bars 21 through 24 may be binary coded, i.e., the first bar 21 may move through eight units of displacement, thence the second bar 22 will move through four units of displacement, thence the bar 23 will move through two units of displacement and finally the bar 24 moves through but a single unit of displacement. The units of displacement may correspond to the spacing of the teeth 17 on the rack 16.

Each of the drive bars has associated therewith an electrostrictive or piezoelectric element 40 through 43 which constitutes a pawl engageable with the teeth 17 of the rack 16. The electrostrictive elements are controllable by voltages which may be generated in an output circuit of an accounting machine. When a voltage is impressed across an electrostrictive element 40 the element deforms and bends as shown by the element 42. Fig. 2 shows three of the electrostrictive elements 40, 41, and 43 in a deenergized state and therefore not deformed, while the element 42 is subjected to an electric field thereacross and deforms to engage the rack 16 thereby coupling the drive bar 23 thereto. With the upward motion of the drive bar 23 the rack is likewise engaged to present a selected character of "2" at the printing point 15. Since only one drive bar moves at a time, the electrostrictive elements associated with the other drive bars will ratchet as the rack moves upwardly. Since the drive members 21 through 24 move in a binary arrangement, it is possible to select any one of fifteen characters for presentation at the printing point by selecting an appropriate one or a combination of several of the electrostrictive pawls 40 through 43 to cause an appropriate positioning of the rack 16; or it is possible to provide no displacement of the rack 16 for a non-printing or spacing operation by selecting none of the electrostrictive elements for engagement therewith.

Upon completion of a printing operation, each of the drive members 21 through 24 returns to its initial position of dwell; the rack 16 is returned downwardly to its zero position either by the urging of gravity or by means such as a magnetic clutch arrangement which may be energized for a brief interval during the return stroke of the rack 16; and the electrostrictive elements are all short circuited and deenergized.

Electrostrictive elements 40 through 43 are sold commercially under the trade name of "Mullenbach Capadynes" and consist generally of a ceramic wafer of a barium titanate composition 44 (see Fig. 3) with means for applying an electric field thereto. A thin flexible metal backing 45 is bonded to one side of the barium titanate wafer 44, and the other side 46 is rendered electrically conductive by a metallic plating thereon. A pair of electrical conductors 47 are connected to the backing plate 45 and to the conductive surface 46, and a capacitive element or condenser is thereby formed with the barium titanate ceramic forming the dielectric between the two conductive plates 45 and 46. When a voltage is applied across the conductive plates 45 and 46 the electric field is established across the barium titanate ceramic wafer 44 which causes the crystal to deform and bend as shown by 42 in Figs. 1 and 2. If a voltage is impressed across the metallic plates 45 and 46 and then the circuit including the conductors 47 is opened, the electrostrictive element or capadyne will retain its charge as a condenser, and therefore, the electric field through the barium titanate wafer 44 will continue to exist and the electrostrictive element will remain in its deformed or curved condition. The conductors 47 may be subsequently short circuited thereby discharging the condenser or capadyne whereupon the barium titanate wafer 44 will spring back to its original shape.

Because of the ability of the capadyne or barium titanate element to retain its charge and remain deformed, the pawls 40 through 43 of Figs. 1 and 2 constitute a storage or memory device useful in circuits of computers and accounting machines. Thus, it may be appreciated that a voltage pulse may be applied to the electrostrictive elements 40 through 43 with a timing compatible with the accounting machine to which this device constitutes an output printer, and this timing need not be synchronized with the printing stroke of the positioning device of this instant application. When a voltage pulse is applied to a capadyne element, the element would deform and remain deformed throughout a subsequent printing operation and will return to its initial undeformed state only at the end of the printing operation at which time it may be short circuited. In Fig. 1 there is shown a rudimentary or very simplified electrical circuit 48, 48′ associated with each of the electrostrictive elements 40 through 43 and representative of a portion of the output circuit from an accounting machine. Each of the circuits 48, 48′ includes a voltage source 49 and a three position switch 50. If the switch 50 is moved to its upward position (as shown in the circuit 48′), the voltage from the source 49 is applied directly across the capadyne element and the element is thereby deformed as shown by 42, whereupon the rack 16 is engaged by a selected oscillatory drive bar 23. If the switch 50 is moved downwardly, the capadyne element is short circuited and discharged whereupon the electrostrictive element will remain straight and undeformed as shown by 40, 41, and 43. The third position on the switch 50 is an open position whereupon a charge previously placed upon the capadyne element will remain during a subsequent printing operation.

As heretofore described and as shown in the drawing, the positioning apparatus includes four drive members which move in binary increments to provide fifteen possible positions for the printing rack. It would be an obvious extension of this invention to include a greater number of drive members and to thereby obtain a greater number of printing positions.

It may be further appreciated that several printing racks may be placed side-by-side such that a complete line may be printed simultaneously. For such an arrangement, each drive bar would carry several electrostrictive elements—one element associated with each of the racks. The motion of the drive bars would be as heretofore described, but the selection of character positions of each of the racks would be accomplished by electrical control of the capadyne elements associated therewith.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Positioning apparatus comprising a normally quiescent driven member, an oscillatable drive member, an electrostrictive element mounted on one of the members and engageable with the other member, and control means for deforming said electrostrictive element to mechanically couple the members during a selected stroke of the drive member.

2. Positioning apparatus comprising a normally quiescent driven member, a plurality of oscillatable drive members, an electrostrictive element associated with each of the drive members and engageable with the driven member, and control means electrically associated with the electrostrictive elements for selectively causing the electrostrictive elements to engage the driven member for selective movement thereof.

3. Positioning apparatus comprising a rack, a drive member periodically movable in incremental strokes from a first dwell position to a second dwell position, and an electrostrictive element mounted on the drive member and positioned to engage the rack, said electrostrictive element being operable to engage and move the rack during selected strokes of the drive member.

4. Positioning apparatus comprising a rack, a plurality of drive members, and an electrostrictive element mounted on and movable with each of the drive members, each of said drive members being operable to move linearly in periodic strokes from a first dwell position to a second dwell position, said electrostrictive elements being operable to engage and move the rack during selected strokes of the drive members.

5. Positioning apparatus comprising a rack mounted to slide longitudinally, a plurality of drive bars positioned adjacent to the rack and movable in a direction parallel to the rack, an electrostrictive element mounted on each of the drive bars and engageable with the rack, and a drive means associated with drive bars for moving each of the bars in sequence from a first dwell position to a second dwell position, said electrostrictive elements being operable to selectively engage the rack whereby selected drive bars are coupled to move the rack.

6. Positioning apparatus comprising a rack mounted to slide longitudinally, a plurality of drive bars positioned adjacent to the rack and movable in a direction parallel to the rack, an electrostrictive element mounted on each of the drive bars and engageable with the rack, a drive means associated with drive bars for moving each of the bars in sequence from a first dwell position to a second dwell position, and electrical control means for selectively charging the electrostrictive elements whereby the charged elements will engage and mechanically couple the rack with selected drive bars.

7. Positioning apparatus comprising an oscillatable drive member, a normally quiescent driven member, and an electrostrictive element selectively deformable to engage both members for mechanically coupling the drive member to the driven member.

References Cited in the file of this patent

UNITED STATES PATENTS

| | | |
|---|---|---|
| 2,452,211 | Rosenthal | Oct. 26, 1948 |
| 2,497,108 | Williams | Feb. 14, 1950 |
| 2,756,353 | Sansel | July 24, 1956 |